Patented Aug. 26, 1947

2,426,165

UNITED STATES PATENT OFFICE 2,426,165

VULCANIZATE OF COPOLYMER OF BUTADIENE AND STYRENE HAVING DISPERSED THEREIN PARACOUMARONE RESIN AND FILLER

Theodore A. Bulifant, Hackensack, N. J., assignor to Allied Chemical & Dye Corporation, New York, N. Y., a corporation of New York No Drawing. Application February 10, 1944, Serial No. 521,847

7 Claims. (Cl. 260—41)

This invention relates to the art of compounding substitutes for natural rubber and more particularly to compounding butadiene-styrene copolymer.

Black vulcanizates (products of vulcanization) of butadiene-styrene copolymer, frequently designated as Buna S and more recently as G R-S synthetic rubber, having adequate tensile strength and other properties for many practical uses, may be obtained by incorporating certain carbon-black fillers, particularly channel black, in the copolymer prior to vulcanization. There is, however, a large industry and consumer demand for vulcanized rubber and rubber-like products of light color, e. g. white, gray, red, etc., that cannot be met by black vulcanizates containing carbon-black fillers. In the case of natural rubber, this need has been met successfully by using white or light-colored fillers such as calcium carbonate, clay, etc. It has been found, however, that such fillers, satisfactorily employed in making non-black vulcanizates from natural rubber, do not impart to butadiene-styrene copolymer sufficient tensile strength and tear resistance for the manufacture of satisfactory products.

It is an object of this invention to improve the tensile and tear-resisting properties of vulcanizates of butadiene-styrene copolymer containing non-black fillers.

It is a further object of the invention to provide a process of compounding butadiene-styrene copolymer with non-black fillers of the lithopone type to obtain vulcanizates of improved tensile and tear-resisting properties. Other objects and advantages will appear hereinafter.

This invention involves the discovery that, by compounding butadiene-styrene copolymer with finely divided filler containing from 50% to 80% of barium sulfate and from 20% to 50% of zinc sulfide by weight, for example lithopone, of particle size such that at least 90% of the filler particles do not exceed 15 microns in diameter or thickness and with paracoumarone resin of a melting point above 75° C., preferably within the range of 100° to 140° C., an unexpected improvement in the tensile and tear-resisting properties of the copolymer vulcanizates is obtained. Preferably, the copolymer is compounded with the filler and paracoumarone resin in proportions of from 20 to 60 parts by volume of filler to each 100 parts by volume of the copolymer and with 15 to 30 parts by weight of the resin to each 100 parts by weight of the copolymer.

A vulcanizing agent, usually sulfur, vulcanizing accelerator, and a metal oxide which activates the accelerator are dispersed in the copolymer prior to vulcanization.

The filler is of fine or ultra-fine particle size. As hereinabove disclosed, the filler should be sufficiently finely divided so that at least 90% of the particles do not exceed 15 microns in diameter or thickness; preferably, the filler particles have an average diameter or thickness of less than than 1 micron.

I have found that by compounding butadiene-styrene copolymer with finely divided filler having the characteristics described above and paracoumarone resin of a melting point above 75° C., a remarkable increase in the tensile strength of the vulcanizates, as compared with vulcanizates containing the same amount of similar filler and other softeners, or no softener, is accomplished. The improvement is of such magnitude that the vulcanizates may satisfactorily be employed for many purposes for which butadiene-styrene copolymer vulcanizates containing non-black fillers heretofore had little or no utility. For example, as described more fully hereinbelow, the tensile strength of vulcanizates made in accordance with the invention is several times as great as that of vulcanizates containing no paracoumarone resin. The tear resistance and the elongations of the vulcanizates under given stress and at the breaking point are also substantially increased. Heretofore, non-black butadiene-styrene copolymer vulcanizates compounded with non-black fillers possessed insufficient tensile strength or tear resistance, or both, for most purposes for which the corresponding non-black natural rubber vulcanizates were employed. However, non-black vulcanizates compounded in accordance with the invention, owing to their improved tensile and tear-resisting properties, may satisfactorily be employed as substitutes for vulcanized non-black rubber in many applications.

The paracoumarone resin employed in accordance with the invention may be produced by catalytic or heat polymerization of the polymerizable constituents of oils recovered from coal-tar and water-gas-tar by distillation, oils obtained in the production of such tars and oils collecting in manufactured gas distribution and storage systems. Examples of such oils are solvent naphtha, crude benzol, toluol, and xylol, light oil and drip oils. Such oils contain varying but substantial amounts of unsaturated resin-forming constituents such as coumarone, indene, styrene and their homologs, and the resins produced from these oils may contain polymerization products of two or more of these constituents. The oil fractions employed in making the resins boil within the range of 125° to 200° C., preferably 150° to 200° C., and may contain minor amounts of polymerizable materials boiling without these ranges. The relative amounts of constituents in commercial resins and the physical properties of the resins will depend on several factors, well known in the art, such as, for example, boiling range of the oil fraction, temperature and time of polymerization, nature and amount of catalyst, if any. Starting with a given oil fraction, the composition and properties of resins will depend largely on polymerization conditions, e. g. whether polymerization is effected by heat or by use of a catalyst such as 66° Bé. sulfuric acid. The expression "paracoumarone resin" as employed herein includes such catalyst-polymerized and heat-polymerized products. As hereinabove pointed out, the resin should have a melting point of at least 75° C., preferably between 100° and 140° C. If desired, resin of the preferred melting point may be made by blending paracoumarone resin of higher melting point, say 160° C., with sufficient high boiling oil, e. g. coal-tar oil boiling within the range of 200° to 350° C., to produce a mixture of the desired melting point.

In addition to the filler and paracoumarone resin the butadiene-styrene copolymer should be compounded with suitable amount of vulcanizing agent, preferably sulfur, vulcanizing accelerator, and aliphatic fatty acid such as stearic acid. The sulfur is employed in proportions by weight of from 1 to 5 parts, preferably about 2 parts for each 100 parts of the copolymer. Any accelerator capable of accelerating vulcanization of the copolymer, either alone or in combination with an activating accelerator, may be utilized. Examples of the accelerator types are: aldehydeamines, such as formaldehyde-aniline reaction products and butyraldehyde-aniline reaction products; guanidines, such as diphenylguanidine and diphenylguanidine oxalate; thiazoles, such as 2-mercaptobenzothiazole, mixed dimethyl and ethyl thiazyldisulfides, and benzothiazyl-2-monocyclohexylsulfenamide; thiazolines, such as mercaptothiazoline; thiuram sulfides, such as tetramethylthiuram monosulfide and tetramethylthiuram disulfide; and dithiocarbamates, such as N-pentamethylene ammonium pentamethylenedithiocarbamate and zinc dimethyldithiocarbamate. From 3 to 10 parts by weight of a metallic oxide capable of activating the accelerator, preferably about 5 parts of zinc oxide, should be incorporated in each 100 parts of the copolymer; other accelerator-activating metallic oxides are litharge and magnesium oxide.

Dispersion of the paracoumarone resin, filler and other compounding ingredients in the butadiene-styrene copolymer may be accomplished in various ways utilizing conventional equipment of the type employed for compounding natural rubber, e. g. rubber mills of the roll type or internal mixers such as the Banbury mixer. For example, a master batch of the copolymer and paracoumarone resin may be made by thoroughly dispersing in the copolymer a high proportion of paracoumarone resin, e. g. 20 to 100 parts by weight of the resin for each 100 parts of the copolymer, and milling a sufficient amount of the master batch with copolymer containing no resin and with the other compounding ingredients to produce a compound containing the desired proportions of the various materials. Alternatively, the sulfur may be first dispersed in the copolymer by milling and the other compounding ingredients then dispersed. If desired, the sulfur may be first dissolved in the paracoumarone resin by heating the sulfur and resin together, the resultant resin-sulfur blend dispersed in the copolymer followed by dispersion of the filler, activating metal oxide and accelerator. It is desirable, particularly when employing accelerators having a tendency to scorch the copolymer, to incorporate the accelerator after the other compounding materials in order to prevent scorching during the compounding operation.

The following example is further illustrative of the invention:

*Example*

| | Parts by weight |
|---|---|
| Butadiene-styrene copolymer | 100 |
| Paracoumarone resin (melting point 115°–125° C.) | 25 |
| Lithopone | 125 |
| Zinc oxide | 5 |
| Sulfur | 2 |
| Benzothiazyl-2-monocyclohexyl sulfenamide (accelerator) | 1.75 |
| Total | 258.75 |

The paracoumarone resin employed was produced by polymerization of the resin-forming constituents of coal-tar and water-gas-tar distillate fractions boiling within the range of 150° to 200° C. with concentrated (66° Bé.) sulfuric acid and was constituted chiefly of the polymers of indene, coumarone, and homologs styrene. The lithopone was of an average particle size of less than 1 micron and was constituted of about 30% by weight of zinc sulfide and 70% by weight of barium sulfate. The amount of lithopone employed was about 30 parts by volume per 100 parts by volume of the butadiene-styrene copolymer. The copolymer was milled for 5 to 10 minutes at mill roll temperatures of about 130° F. and the sulfur, zinc oxide and lithopone were added while milling at this temperature. The mill roll temperature was then elevated to 170° to 180° C. and the paracoumarone resin was added; within several minutes the resin was completely dispersed in the copolymer. The batch was then removed from the mill, allowed to cool for several hours, and the accelerator was dispersed in the copolymer while milling at mill roll temperatures below 130° F. The compound was then cured for 30 minutes at 307° F. corresponding to the steam pressure (gauge) of about 60 pounds per square inch.

The resultant light-colored vulcanizate was tested both before aging and after aging for 7 days at 70° C. The following are test results on the vulcanizate of the example and the results of similar tests on a vulcanizate which contained no paracoumarone resin but which otherwise contained the same materials and was made by the same procedure as the vulcanizate of the example.

| | Properties of Vulcanizate of the Example | Properties of Vulcanizate containing no paracoumarone resin |
|---|---|---|
| Tear resistance (Crescent) | 75 | 60 |
| Tensile strength (pounds per square inch): | | |
| Unaged | 1,200 | 300 |
| Aged | 1,200 | 300 |
| Elongation (per cent at breaking point): | | |
| Unaged | 700 | 380 |
| Aged | 550 | 66 |
| Modulus (300 per cent): | | |
| Unaged | 150 | |
| Aged | 250 | |

It will be observed that the tensile strength of the vulcanizate of the example containing lithopone and paracoumarone resin was much greater than that of the vulcanizate containing the same filler but no paracoumarone resin. The combination of filler and resin also materially increased the tear resistance and elongation at the breaking point and for given stress of the vulcanizate. Vulcanizates containing the combination of the filler and paracoumarone resin of this invention possess properties adapting them for use for most purposes for which non-black vulcanizates are required, while vulcanizates containing such filler but no paracoumarone resin are not a satisfactory substitute for natural rubber vulcanizates.

Thus it will be seen the invention markedly improves the tensile properties and tear resistance of vulcanizates of butadiene-styrene copolymer compounded with filler containing from 50% to 80% of barium sulfate and from 20% to 50% of zinc sulfide by weight. This improvement renders the vulcanizates suitable for many purposes for which non-black vulcanizates of butadiene-styrene copolymer formerly had no utility owing to their lower tensile strength and tear resistance. The invention provides a new class of vulcanizates suitable for the manufacture of articles, such as drug sundries, e. g. hot water bottles, mechanical rubber goods, footwear and household articles, for which black vulcanizates are not commercially acceptable. The vulcanizates of the invention are primarily adapted for relatively static uses in which they are not subjected to a high degree of repeated flexure and deformation but in some cases may be employed for various dynamic purposes.

The resin melting points given herein are determined by the cube-in-mercury method described in "Protective and Decorative Coatings," vol. 1, copyright 1941, by J. J. Matiello, pages 366–367, published by John Wiley & Sons, Inc., New York, New York. The melting points of 75° C., 100° C. and 140° C. determined by this method correspond approximately to melting points of 69° C., 88° C. and 119° C., respectively, as determined by Ring and Ball Method (A. S. T. M. Standard D36-26). The properties of the rubber given herein were determined by the following methods: tear resistance (crescent) by A. S. T. M. Method D624–41T (pounds per inch thickness); tensile strength, modulus and elongation by A. S. T. M. Method D412–41 (¼" die).

Since certain changes may be made without departing from the scope of the invention, it is intended that the above shall be interpreted as illustrative and not in a limiting sense.

I claim:

1. A process of making vulcanizates of vulcanizable butadiene styrene copolymer which comprises compounding the copolymer with vulcanizing agent, paracoumarone resin of a melting point of at least 75° C. and filler containing from 50% to 80% of barium sulfate and from 20% to 50% of zinc sulfide by weight, at least 90% of which is of a particle size not exceeding 15 microns, said copolymer, paracoumarone resin and filler being compounded in proportions of from 15 to 30 parts by weight of the resin to 100 parts by weight of the copolymer and from 20 to 60 parts by volume of the filler to 100 parts by volume of the copolymer, and vulcanizing the resultant compound to a resilient vulcanizate.

2. A process as specified in claim 1 in which the filler is lithopone of an average particle size of less than 1 micron.

3. A process of making vulcanizable butadiene-styrene copolymer vulcanizates of improved tensile strength and tear resistance which comprises compounding the copolymer with from 20 to 60 parts by volume of type filler per 100 parts by volume of the copolymer, said filler containing from 50% to 80% barium sulfate and from 20% to 50% of zinc sulfide by weight, at least 90% of the filler being of a particle size not exceeding 15 microns, and 15 to 30 parts by weight of paracoumarone resin of a melting point within the range of 100° to 140° C. per 100 parts by weight of the copolymer, from 1 to 5 parts by weight of sulfur for each 100 parts by weight of the copolymer, vulcanizing accelerator, and from 3 to 10 parts by weight of an accelerator-activating metallic oxide per 100 parts by weight of copolymer, and vulcanizing the resultant compound.

4. A process of making vulcanizable butadiene-styrene copolymer non-black vulcanizates of improved tensile strength and tear resistance which comprises compounding the copolymer with from 20 to 60 parts by volume of lithopone filler of an average particle size less than 1 micron per 100 parts by volume of the copolymer, 15 to 30 parts of paracoumarone resin of a melting point within the range of 100° to 140° C. per 100 parts by weight of the copolymer, from 1 to 5 parts by weight of sulfur for each 100 parts by weight of the copolymer, vulcanizing accelerator, and from 3 to 10 parts by weight of zinc oxide per 100 parts by weight of the copolymer, and vulcanizing the resultant compound.

5. A vulcanizate prepared by vulcanizing vulcanizable butadiene-styrene copolymer having dispersed therein vulcanizing agent, paracoumarone resin of a melting point of at least 75° C., filler containing from 50% to 80% of barium sulfate and from 20% to 50% of zinc sulfide by weight, at least 90% of which is of a particle size not exceeding 15 microns, said filler being present in amount of from 20 to 60 parts by volume per each 100 parts by volume of the copolymer, said paracoumarone resin being present in amount of from 15 to 30 parts by weight per 100 parts by weight of the copolymer, and said vulcanizing agent being present in amount to yield a resilient vulcanizate.

6. A vulcanizate as specified in claim 5 in which the filler is of an average particle size not exceeding 1 micron and the paracoumarone resin has a melting point within the range of 100° to 140° C.

7. A vulcanizate prepared by vulcanizing vulcanizable butadiene-styrene copolymer having dispersed therein sulfur, paracoumarone resin of a melting point of at least 75° C., a filler containing from 50% to 80% by weight of barium sulfate and from 20% to 50% by weight of zinc sulfide, said filler being of an average particle size not exceeding one micron, said filler being present in amount of from 20 to 60 parts by voulme for each 100 parts by volume of said copolymer, said paracoumarone resin being present in amount of from 15 to 30 parts by weight per 100 parts by weight of the copolymer, and said sulfur being present in amount of from 1 to 5 parts by weight per 100 parts by weight of the copolymer.

THEODORE A. BULIFANT.

REFERENCES CITED

The following references are of record in the file of this patent:

UNITED STATES PATENTS

| Number | Name | Date |
|---|---|---|
| 2,243,386 | Lewis et al. | May 27, 1941 |
| 1,248,226 | Wells | Nov. 27, 1917 |

OTHER REFERENCES

J. J. Matiello, Protective and Decorative Coatings, vol. II, page 380, published 1942 by John Wiley & Sons, Inc., New York, N. Y.

Certificate of Correction

Patent No. 2,426,165.  August 26, 1947.

THEODORE A. BULIFANT

It is hereby certified that error appears in the printed specification of the above numbered patent requiring correction as follows: Column 6, line 24, before the word "filler" strike out "type"; and that the said Letters Patent should be read with this correction therein that the same may conform to the record of the case in the Patent Office.

Signed and sealed this 11th day of November, A. D. 1947.

[SEAL]

THOMAS F. MURPHY,
*Assistant Commissioner of Patents.* dispersed therein sulfur, paracoumarone resin of a melting point of at least 75° C., a filler containing from 50% to 80% by weight of barium sulfate and from 20% to 50% by weight of zinc sulfide, said filler being of an average particle size not exceeding one micron, said filler being present in amount of from 20 to 60 parts by voulme for each 100 parts by volume of said copolymer, said paracoumarone resin being present in amount of from 15 to 30 parts by weight per 100 parts by weight of the copolymer, and said sulfur being present in amount of from 1 to 5 parts by weight per 100 parts by weight of the copolymer.

THEODORE A. BULIFANT.

REFERENCES CITED

The following references are of record in the file of this patent:

UNITED STATES PATENTS

| Number | Name | Date |
|---|---|---|
| 2,243,386 | Lewis et al. | May 27, 1941 |
| 1,248,226 | Wells | Nov. 27, 1917 |

OTHER REFERENCES

J. J. Matiello, Protective and Decorative Coatings, vol. II, page 380, published 1942 by John Wiley & Sons, Inc., New York, N. Y.

---

Certificate of Correction

Patent No. 2,426,165.　　　　　　　　　　　　　　　　　　August 26, 1947.

THEODORE A. BULIFANT

It is hereby certified that error appears in the printed specification of the above numbered patent requiring correction as follows: Column 6, line 24, before the word "filler" strike out "type"; and that the said Letters Patent should be read with this correction therein that the same may conform to the record of the case in the Patent Office.

Signed and sealed this 11th day of November, A. D. 1947.

[SEAL]

THOMAS F. MURPHY,
*Assistant Commissioner of Patents.*